July 27, 1965
A. E. CROUCH
3,197,781
APPARATUS FOR TESTING AND GRADING ELONGATE MEMBERS
Filed July 31, 1963
2 Sheets-Sheet 1
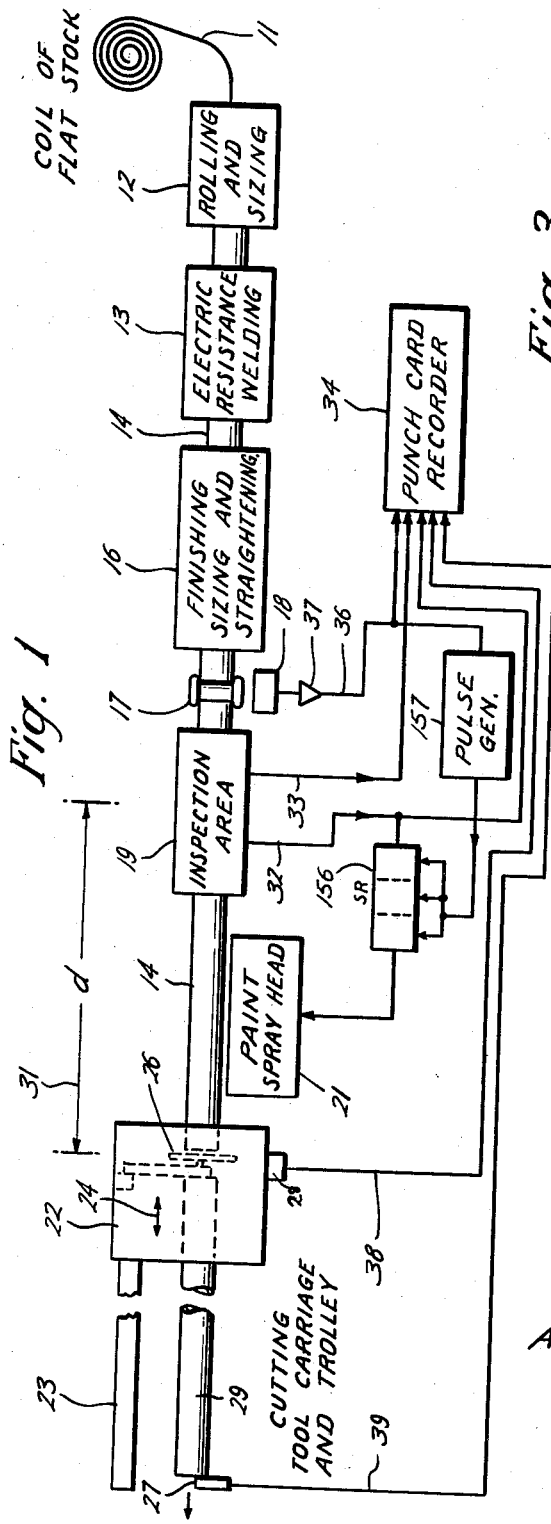
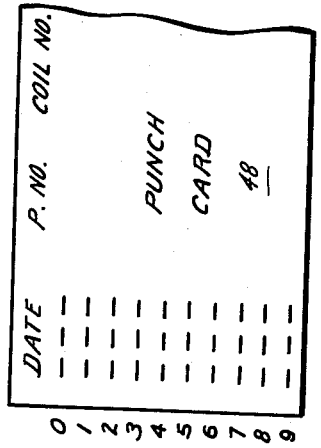
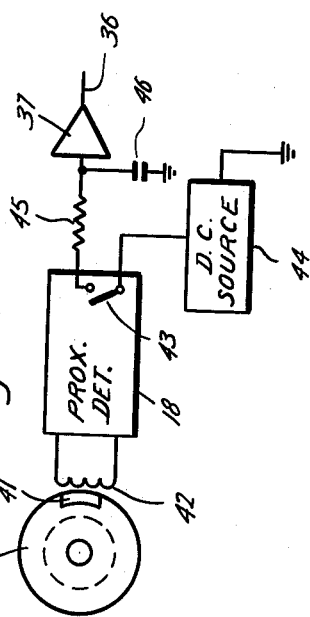
Alfred E. Crouch
INVENTOR.
BY Arnold, Roylance & Harris
ATTORNEYS Alfred E. Crouch
INVENTOR.

United States Patent Office 3,197,781
Patented July 27, 1965

3,197,781
APPARATUS FOR TESTING AND GRADING
ELONGATE MEMBERS
Alfred E. Crouch, Houston, Tex., assignor, by mesne assignments, to American Machine & Foundry Company, New York, N.Y., a corporation of New Jersey
Filed July 31, 1963, Ser. No. 298,870
6 Claims. (Cl. 346—33)

This invention relates to an apparatus for testing and grading elongate members for defects. More particularly, the invention relates to an apparatus and method for detecting defects in an elongate member and recording those defects on a record medium.

In the testing and grading of elongate members, such as tubular goods, as for example pipe, there has long been a need for a method and apparatus that would detect defects in the member, accumulate information concerning such defects for a specified interval, and then record those defects at predetermined intervals.

The result is that there has been no adequate means to grade pipe and the like and to make a permanent record, so that proper quality control measures could be adapted and/or so that pipe could be graded for defects and a permanent record could be made of those defects.

It is therefore an object of this invention to provide an apparatus for testing and grading elongate members for defects and making a permanent record of the defects in the elongate member.

It is another object of this invention to detect defects in an elongate member and to record the most serious of said defects detected during a specified interval of time or in a specified length inspected.

These and other objects will be apparent by reference to the description herein and the drawings wherein the same numerals refer to like elements and in which:

FIG. 1 is a schematic diagram showing one embodiment of the detection and recording means of this invention as it is utilized in relation to an electric resistance welded pipe forming installation;

FIG. 2 is a block diagram showing a motion sensing apparatus which may be used in one embodiment of this invention;

FIG. 3 shows a portion of one form of the record medium used in this invention in the form of a punch card.

Figure 4:
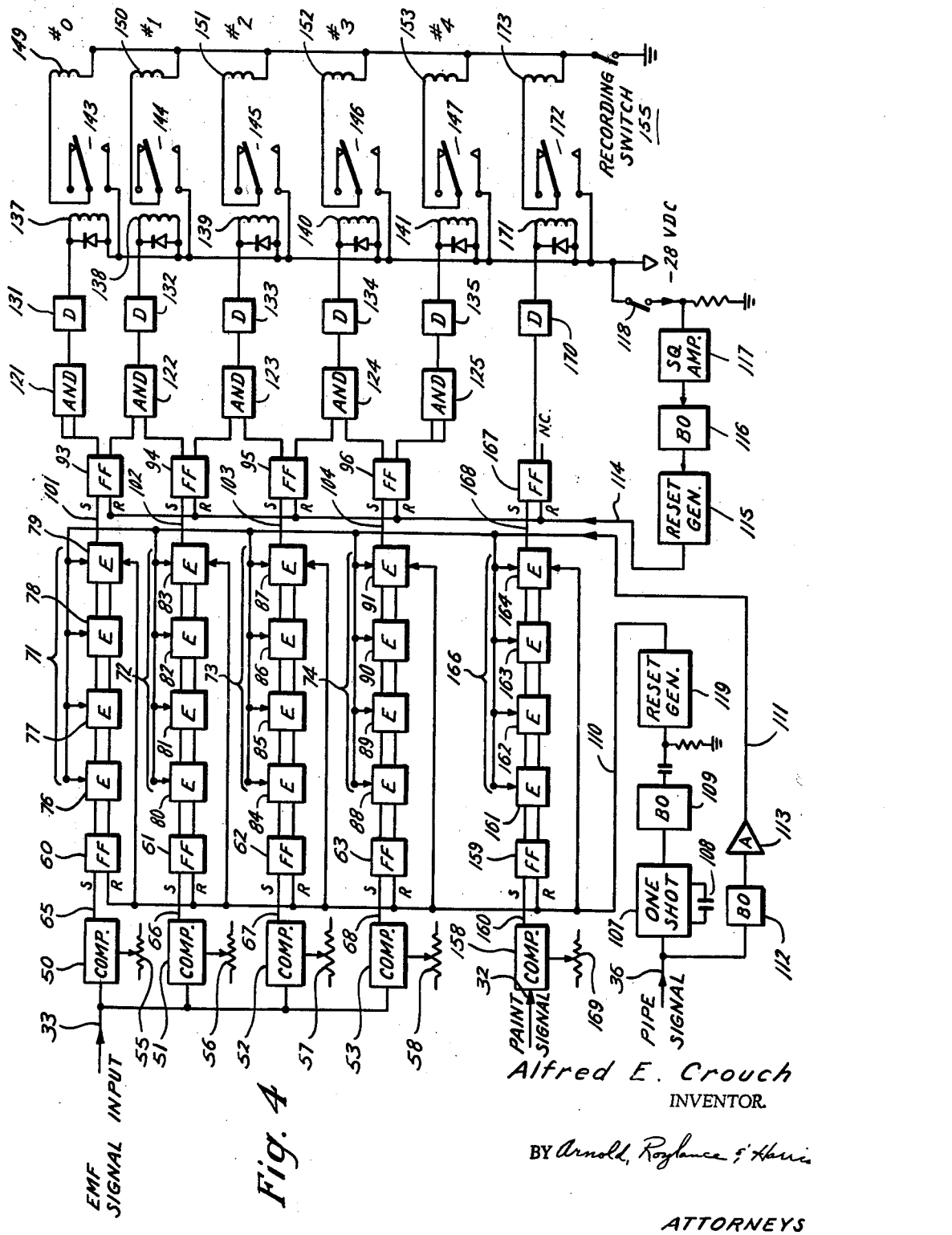
FIG. 4 is a block diagram showing the electrical circuit of one embodiment of this invention.

Referring to FIG. 1 there is generally shown a coil of iron flat stock 11 being fed into a rolling and sizing apparatus 12, followed by an electric resistance welding apparatus 13 to form pipe 14, which is then passed through finishing and sizing apparatus 16.

Pipe 14 then passes over and is in frictional engagement with proximity detector wheel 17, thus causing wheel 17 to rotate and to actuate proximity detector 18 as will be explained hereinafter.

Pipe 14 is then caused to pass through or by flaw inspection device 19, past paint gun 21, and past cutoff tool 22 slidably mounted on tool track 23 for reciprocal axial movement with respect to pipe 14 as shown by arrow 24.

Cutoff tool 22 has a saw blade 26 which may be operated manually or it may be operated automatically, as for example when the end of pipe 14 contacts limit switch 27, thereby cutting off a section of pipe of the desired length.

In addition, the activation of saw blade 26 is arranged to close saw switch 28, the operation of which will be explained hereinafter.

As shown in FIG. 1, saw blade 26 has just been actuated and a section of pipe 14 has been severed forming pipe length 29.

Thus it will be seen that inspection device 19 has inspected length 29 as that portion of pipe 14 was moved therepast. Thus, it is important to be able to store up a record of any defects detected in length 29 and to record any such defects after length 29 has been severed from pipe 14, hence correlating the recorded defects within a specific length of pipe. Generally speaking, the defect signals produced by inspection device 19 for length 29 must be stored until length 29 is cut off, which means that the cutoff end of length 29 will have traveled distance $d$ on arrow 31 from the point of inspection to cut off.

Inspection device 19 may take any of a number of forms such as electromagnetic inspection, mechanical calipers, gamma ray inspection and the like, so long as the device employed will produce electrical responses the level of which reflect the degree of defect detected. Thus, it is apparent that other goods, such as wires, cables, rods and the like may likewise be inspected and still fall within the scope of this invention.

Inspection device 19 could also be two or more different devices producing two or more electrical signals, each representing a different type of defect. Such is the case with inspection device 19, which has lead 32 on which is placed electrical signals representing defects of such magnitude to make the pipe rejectable or unsuitable for the use intended and lead 33 on which is placed electrical signals representing variations in flux leakage signals generated by variations in a magnetic field. (See the technical reference section below for types of inspection devices that may be used.)

The electrical circuit and recording means of this invention are generally shown as punch card recorder 34 which is connected to proximity detector 18 by lead 36 passing through squaring amplifier 37, to saw switch 28 by lead 38, to limit switch 27 by lead 39, and to leads 32 and 33 previously described.

Referring to FIG. 2, wheel 17 is provided with metal slug 41, which is rotated past coil 42 with each revolution of wheel 17 as pipe 14 moves relative thereto, thus closing switch 43, thereby placing a D.C. voltage through squaring amplifier 37 from D.C. source 44 past resistor 45 and capacitor 46 to lead 36. Hence the output on lead 36 may be described as a pipe movement sensing signal representing the relative axial movement of pipe 14 with respect to wheel 17 and inspection device 19.

The record medium of this invention may take any one of a number of forms such as magnetic tape or the like, but is conveniently shown in the form of a punch card 48, a portion of which is shown in FIG. 3.

The top of card 48 is provided with blank spaces for recording such information as the date, the production number or order number, and number of the coil from which the flat stock used to form the pipe is taken. The numerals 0–9 down the left side of the cord are used to denote hole positions. Each vertical row of dash lines are arranged to represent one length of pipe. Thus, for example, the 0 position in the first row could be punched by the recording means to indicate that no defect was encountered in a length of pipe, the positions 1–5 could be used to indicate increasing degrees of seriousness of defects, and positions 6–9 could be used for other information, such as a pipe length with a rejectable defect, or the fact that a particular length of pipe was shorter than average.

Referring to FIG. 4, there is generally shown the block diagram of the electrical circuit of the recording means of this invention.

Flux leakage (E.M.F.) defect signal input is applied by lead 33, paint gun signal input by lead 32, and pipe movement sensing signal input by lead 36.

Lead 33 is connected to a plurality of first electrical circuits in the form of comparators 50–53 adjustably controlled by potentiometers 55–58, respectively, and connected to first flip-flop circuits 60–63 by leads 65–68, respectively.

Each of the flip-flop circuits is connected to an electrical pulse or signal storage unit, each of which has a plurality of pulse or signal storage elements. The pulse or signal storage units take the form of shift registers, hence flip-flop circuit 60 is connected to shift register 71, which has a plurality of electrical pulse or signal storage elements 76–79.

Flip-flop circuit 61 is connected to shift register 72 which has pulse or signal storage elements 80–83.

Flip-flop circuit 62 is connected to shift register 73 which has pulse or signal storage elements 84–87.

Similarly, flip-flop circuit 63 is connected to shift register 74 having signal or pulse storage elements 88–91.

Pulse or signal storage elements 76, 80, 84 and 88 are considered the first in sequence and elements 79, 83, 87 and 91 are considered the last in sequence in each of the shift registers of which they are a part.

Further, elements 79, 83, 87 and 91 are each connected to a second electrical circuit, each circuit of which has a second flip-flop circuit and an AND circuit. Hence, flip-flop circuits 93–96 are respectively connected to elements 79, 83, 87 and 91 by leads 101–104.

Flip-flop circuits 60–63 are arranged to be placed in the set position by input signals applied over leads 65–68 respectively and the letter S adjacent thereto indicates the set input. Similarly, flip-flop circuits 60–63 are arranged to be placed in the reset position by input signals applied over lead 110, with the letter R adjacent thereto indicating the reset input. The input signal on leads 65–68 are applied by comparators 50–53 respectively, and the input on lead 110 is in the form of pipe movement sensing signals applied to lead 36, to one-shot 107 having capacitor 108, to blocking oscillator 109, and through reset generator 119.

Each of the pulse storage elements 76–91 is connected to lead 111 to receive electrical transfer signals at preselected intervals produced by proximity detector 18 and applied to lead 36, to blocking oscillator 112 through amplifier 113.

Flip-flop circuits 93–96 are arranged to be placed in the reset position by inputs applied over leads 101–104 respectively at preselected intervals by clearing signals applied over lead 114 through reset generator 115, blocking oscillator 116 and squaring amplifier 117. The letters R adjacent to flip-flop circuits 93–96 indicate the reset input while the letters S indicate the set input. The preselected interval at which the clearing signals are applied is determined by operation of clearing switch 118 which is operated by the actuation of saw switch 28.

The output of flip-flop circuit 93 in the reset position, is transmitted to AND circuit 121, and in the set position to AND circuit 122. It will be observed that the output of flip-flop 93 in the reset position is transmitted to both inputs of AND circuit 121.

Flip-flop circuit 94 transmits an output to AND circuit 122 in the reset position, and an output to AND circuit 123 in the set position.

Flip-flop circuit 95 transmits an output to AND circuit 123 when in the reset position and an output to AND circuit 124 in the set position.

Similarly, flip-flop circuit 96 transmits an output to AND circuit 124 in the reset position and an output to AND circuit 125 in the set position.

Both inputs to AND circuit 125 are connected to the output of flip-flop circuit 96 when flip-flop circuit 96 is in the set position.

The output of AND circuits 121–125 are respectively applied to drivers 131–135 to operate relays 137–141, to thereby operate relay switches 143–147, thereby applying −28 volts D.C. to hole punching solenoids 149–153, respectively, when recording switch 155 is closed either automatically by operation of limit switch 27 or saw switch 28 when a short length of pipe is to be cut.

Flip-flop circuits 93–96 are of the type which are placed in the set position by a sharply rising voltage. Hence, pulse storage elements 79, 83, 87 and 91 are placed in a reset position by a reset pulse applied by lead 110 immediately after a transfer pulse has been applied thereto over lead 111. This will then permit flip-flop circuits 93–96 to be operated when defects of the same level are detected successively.

Operation

In operation, inspection device 19, in the form of magnetic responsive coils (not shown) place flux leakage defect signals on lead 33, which defect signals are applied to comparators 50–53, each of which is set, by operation of its respective potentiometer, to transmit an electrical impulse only if the defect signal received is above a preselected level. In this instance, comparator 50 would be set to be responsive to the smallest defect signal to be detected and comparator 53 would be set to be responsive to the largest defect signal to be detected and comparators 51 and 52 would be set at intermediate levels.

Assume that a defect signal just large enough to cause comparator 50 to respond is detected. Comparator 50 would produce an electrical impulse which would be applied to flip-flop circuit 60, thus placing it in the set position, thereby transmitting a signal to pulse storage element 76 of shift register 71. The transmitted signal would be stored in element 76 until wheel 17 and slug 41 caused proximity detector 18 to place a pipe movement sensing signal on lead 36, through blocking oscillator 112, amplifier 113 and thus applying electrical transfer signals to lead 111. The applied transfer signals would progressively move the stored electrical signal through elements 77, 78 and 79 to flip-flop circuit 93. The intervals at which the transfer signals are applied to the pulse storage elements will, of course, be predetermined intervals, with the determination depending on the relative movement of pipe 14 and thus the speed at which wheel 17 is rotated. This could be varied by the size of the wheel 17 or the number of metal slugs placed on the wheel.

Flip-flop circuit 60 is immediately placed in the reset position as soon as the stored signal is transferred from element 76. This is accomplished by operation of one-shot 107, whereby its capacitor 108 delays the output to blocking oscillator 109 and reset generator 119 a small interval of time such that the reset pulse is applied to flip-flop circuit 60 by lead 110 after the stored signal is transferred from element 76. With flip-flop circuit 60 now reset, it is then ready to receive another impulse from comparator 50 as an indication of another defect of a preselected level.

As described above, the stored signal has now reached flip-flop circuit 93, which might be described as the final signal storage position. Flip-flop circuit 93 will be placed in the set position by operation of the electrical signal applied from element 79, hence an output will be applied to AND circuit 122, which will also be receiving an output from flip-flop circuit 94, which would then be in the reset position. Therefore, AND circuit 122 will be receiving two inputs and producing an output to driver 132.

If no other defects are detected in the length of pipe which produced the defect signal, then AND circuit 132 will remain on until recording switch 155 is closed by operation of limit switch 27 or alternatively, saw switch 28 in the case of a short pipe length. With the closing of switch 155 relay 138 will then close relay switch 144, thus applying D.C. voltage to solenoid 150, thereby punching a hole in punch card 48, indicating a #1 level of flaw or defect for that particular length of pipe.

At this point, the occurrence of the defect will be recorded. However, the operator of the pipe mill may have temporarily decided to produce one length of pipe which was longer than other lengths to cut down on waste, for example, where a reject defect occurs near the end of one length of pipe. In that event, the operator could place cutoff tool 22 on manual operation and perform the cutoff operation at some point after the pipe length contacted limit switch 27. However, when the operator does perform the cutoff operation, saw switch 28 will be activated, thus activating clearing switch 118, which thereby causes a clearing signal to be applied to lead 114, thus placing flip-flop circuit 93 back in the reset position. Thus, the circuit is then ready to start accumulating defect information on a new length of pipe.

It will be noted that the number of signal or pulse storage elements in each shift register will be selected so that the last portion of each pipe length inspected will have moved distance $d$ on arrow 31 by the time the defect signal is recorded by operation of recording switch 155.

If it were assumed that no defects were detected for a specified length of pipe, then AND circuit 121 would remain on since it would be receiving an output from flip-flop circuit 93, which would have remained in the reset position. None of the other AND circuits would be receiving two inputs, hence only punch solenoid 149 would be activated, to record a zero reading by punching a hole indicating no defects.

Now let it be assumed that in a specified length of pipe, a #1 level defect was first detected and flip-flop circuits 93 were placed in the set position as described above, and subsequently another defect of a level to activate comparator 53 is detected in the same pipe length. A first electrical pulse would be transmitted to flip-flop circuit 63, and a signal would be progressively transferred through signal or pulse storage elements 88–91 to a first storage position at flip-flop circuit 96. Since the defect signal was large enough to activate comparator 53, it obviously was large enough to activate intermediate comparators 51 and 52. Thus, pulses would likewise have been transmitted to flip-flop circuits 94 and 95.

Flip-flop circuit 93 would then be placed in the set position and transmitting an output to AND circuit 122. Similarly, flip-flop circuits 94, 95 and 96 would be placed in the set position, so that AND circuit 125 would be the only such circuit receiving two inputs and producing an output signal. Thus, when recording switch 155 is activated as described above, only solenoid 153 would be activated to punch a hole representing the most serious flaw level or #4 level.

Alternatives

There are, of course, many alternative arrangements which are possible with this invention. For example, additional information could be accumulated regarding a particular length of pipe and could be similarly recorded. Referring to FIG. 1, inspection device 19 might be arranged to produce a signal on lead 32, which would represent a reject defect. This reject signal could also be used to operate a paint gun 21 positioned axially apart from inspection device 19, as is taught and claimed in copending application Serial No. 291,636 filed July 1, 1963, entitled Motion Responsive Flaw Marking Apparatus and Method. The reject signals are progressively transferred through shift register 156 by operation of transfer pulses generated by proximity detector 18 and applied through pulse generator 157. The signals produced on lead 32 could also be applied to comparator 158 shown in FIG. 4, to produce electrical pulses to flip-flop circuit 159 over lead 160, and flip-flop circuit 159 would then transmit a signal or pulse to storage element 161 of shift register 166 which signal would be successively transmitted through element 162–164 to flip-flop circuit 167 by lead 168, just as with shift registers 71–74 and flip-flop circuits 93–96. Comparator 158 would operate just as comparators 50–53 and would be similarly controlled by potentiometer 169.

The output of flip-flop circuit 167 in the reset position is to NC (no connection) and in the set position to driver 170 and relay 171 to operate relay switch 172 and punch solenoid 173, to record on card 48 the fact that the length of pipe inspected was a reject pipe on which a paint mark was placed. Other information could similarly be recorded, as for example the fact that the pipe length was a short length.

Additional comparators and shift register circuits could be added to give recordings on a greater number of degrees of defect level seriousness.

In some instances, flip-flop circuits 93–96 could be connected directly to relays without AND circuits, but this would cause all punch solenoids, up to the largest defect to operate, thus requiring more power and a stronger punching mechanism.

Instead of punch cards, other record mediums could be used, as for example continuous paper rolls, or magnetic recording means and tape.

It is to be understood that a clock could be substituted for proximity detector 18, so that reset pulses are applied to lead 36 at stated intervals of time rather than in response to a specified distance of relative movement of pipe 14. This would permit the detection of defects in pipe 14 during a predetermined interval of time. Regardless of whether a clock is used or motion sensing means are used, the term "preselected interval" as applied to reset pulses and transfer pulses is used to mean either an interval of time or the time required for a specified distance of relative movement.

Furthermore, recording switch 155 and clearing switch 118 could be arranged to be actuated at specified time intervals rather than in relation to pipe movement and saw operations. Hence the term "preselected intervals," when applied to these operations is likewise meant to include either a specified time interval or an interval of time required for pipe 14 to move a specified relative distance.

Moreover, this invention is also adaptable to the inspection of elongate members which have already been cut into desired lengths. The operations in such cases would still be essentially the same. For example, used drill pipe could be tested in a rack or in a downhole operation.

Technical references

All of the electrical units specified herein are considered standard units unless specified otherwise.

Comparators 50–53 and 158 are of the Schmitt trigger type such as that shown in Military Standardization Handbook 215, Selected Semiconductor Circuits, Dept. of Defense, U.S.A., 15, June 1960, Circuit 6–18, p. 6–63.

Flip-flop circuits 60–63, 159, 93–96 and 167 are of the type shown in Military Standardization Handbook 215 (cited above), Circuit 6–6, p. 6–38.

An example of the clock which could be used in the place of proximity detector 18 is shown as circuit 6–13, p. 6–52, of Military Standardization Handbook 215, cited above, which circuit shows an astable multivibrator.

Blocking oscillators 109, 112 and 116 may be of the type shown in Circuit 6–10, p. 6–66, Military Standardization Handbook 215, cited above.

AND circuits 121–125 are circuits having two input leads and produce one output upon receipt of two input signals and are of the type shown in the book Pulse and Digital Circuits by Millman and Taub, McGraw-Hill Book Co., Inc., N.Y., 1956, Fig. 13–8, p. 398.

Shift registers 71–74, 156 and 166 may take several forms, with one suitable form being shown in Fig. 13–43, p. 426, of the book entitled Pulse and Digital Circuits, by Millman and Taub, cited above.

One form of electromagnetic inspection device which may be used as inspection device 19 is shown in Nondestructive Testing Handbook, edited by Robert C. McMaster, The Ronald Press Co., New York, N.Y., Volume II, p. 40.7, Fig. 4.

Another type of inspection device which may be used is shown in U.S. Patent No. 2,574,311 issued to Zuschlag.

In addition, other forms of inspection devices which may be used are taught in copending applications assigned to the same assignee as the present application and are identified as Magnetic Flux Leakage Inspection Apparatus and Method, filed July 1, 1963, bearing Serial No. 291,750; and Magnetic Inspection Apparatus and Method, filed July 3, 1963, bearing Serial No. 292,630.

Various types of ultrasonic testing devices which could be used as the inspecting unit of this invention are shown in Fig. 23, p. 43–27, Vol II, Nondestrustive Testing Handbook, cited above.

Further modifications may be made in the invention as particularly described without departing from the scope of the invention. Accordingly, the foregoing description is to be construed illustratively only and is not to be construed as a limitation upon the invention as defined in the following claims.

What is claimed is:

1. An aparatus for detecting defects in an elongated member and recording those defects on a recording medium, comprising:

defect detecting scanning means mounted adjacent said elongated member for relative axial movement therewith and adapted to produce electrical defect signals as an incident of defects detected during scanning of said elongated member, a first electrical circuit connected to said scanning means for receiving said defect signals and transmitting first electrical signals when said defect signals are above preselected levels, an electrical signal storage unit having at least two electrical signal storage elements connected in sequence with the first in sequence being connected to said first electrical circuit and receiving said first electrical signals therefrom, electrical signal producing means connected to each of said signal storage elements for applying electrical transfer signals thereto at preselected intervals, a second electrical circuit connected to the last in sequence of said signal storage elements and producing output signals in response to stored signals transferred from said last in sequence of said signal storage elements, recording means connected to said second electrical circuit for receiving said output signals and for recording on a recording medium the receipt of said output signals, whereby defects are detected in said elongated member in the form of said electrical defect signals, which defect signals are applied to said first electrical circuit, which circuit transmit said first electrical signals to said signal storage unit where said signals are stored and progressively transferred said sequence of signal storage elements by operation of said electrical signal producing means and applied to said second electrical circuit, which thereby applies an output signal to said recording means to record occurance of defects above a preselected level.

2. An apparatus for detecting defects in an elongate member and recording those defects on a recording medium, comprising:

a defect sensing means mounted for relative axial movement with respect to said elongate member and producing electrical defect signals in response to defects in said member, a plurality of first electrical circuits connected to said defect sensing means for receiving said defect signals and transmitting first electrical signals when said defect signals are above preselected levels, a plurality of electrical signal storage units, each of which is connected to one of said first electrical circuits for receiving said first electrical signals, and each of said storage units having at least two electrical signal storage elements connected in sequence, whereby said first electrical signals are applied to the first in sequence of said elements, first electrical signal producing means connected to each of said signal storage elements for applying electrical transfer signals thereto at preselected intervals, a plurality of second electrical circuits each of which is connected to the last in sequence of said signal storage elements in one of said signal storage units for producing output signals in response to stored signals transferred from said signal storage unit, a plurality of recording means, each of which is connected to one of said second electrical circuits for receiving said output signals and for recording on a recording medium the receipt of said output signals, whereby defects are detected in said elongate member in the form of said electrical defect signals, which defect signals are applied to said first electrical circuits, which circuits transmit said first electrical signals to said signal storage unit where said signals are stored and progressively transferred through said sequences of said signal storage elements by operation of said first electrical signal producing means and applied to said second electrical circuits which thereby apply an output signal to said recording means to record the occurrence of defects above said preselected levels.

3. The apparatus as claimed in claim 2 wherein:

each of said first electrical circuits includes a comparator which is adjustable to a preselected level, and each of said comparators is connected to a flip-flop circuit which is connected to the first in sequence of signal storage elements in one of said signal storage units.

4. The apparatus as claimed in claim 2 wherein:

each of said second electrical circuits includes an AND circuit which has at least one input connected to a flip-flop circuit, which flip-flop circuit is connected to said last in sequence of said signal storage elements in one of said signal storage units, and each of said flip-flop circuits is adapted to be placed in the set position by said stored signals transferred from said signal storage units and to be placed in the reset position by clearing signals produced at preselected second intervals by a second electrical signal producing means.

5. The apparatus as claimed in claim 4 wherein:

at least one of said AND circuits has one input lead connected to one of said flip-flop circuits and one input lead connected to another of said flip-flop circuits, and at least one of said AND circuits has both input leads connected to only one of said flip-flop circuits.

6. An apparatus for detecting defects in an elongate member and recording the largest of said defects in a preselected portion of said member, comprising:

defect detecting scanning means mounted adjacent said elongate member for relative axial movement therewith and producing electrical defect signals as an incident of defects detected during said movement, a plurality of first electrical circuits connected to said defect scanning means for receiving said defect signals and transmitting first electrical signals when said defect signals are above preselected levels, each of said first electrical circuits comprising a comparator which is adjustable to a preselected level and which is connected to a first flip-flop circuit, said first flip-flop circuit being connected to the first electrical signal storage element in one of a plurality of electrical signal storage units, each of said plurality of electrical signal storage units having at least two electrical signal storage elements connected in sequence, a first electrical signal producing means connected to each of said signal storage elements for applying electrical transfer signals thereto at preselected first intervals, at least two second electrical circuits, each comprising
- a second flip-flop circuit connected to the last in sequence of said signal storage element of one of said signal storage units and adapted to be placed in the set position by signals transferred from said signal storage element and to be placed in the reset position by clearing signals produced at preselected second intervals by a second electrical signal producing means, and
- an AND circuit, with one of said AND circuits receiving an output from one of said second flip-flop circuits when in the set position and receiving an output from another of said flip-flop circuits when in the reset position, and one of said AND circuits receiving two inputs from one of the outputs of one of said flip-flop circuits, and a plurality of recording means, each of which is connected to one of said AND circuits for receiving output signals therefrom and for recording on a recording medium the receipt of said output signals.

References Cited by the Examiner

UNITED STATES PATENTS

| | | | |
|---|---|---|---|
| 1,907,549 | 5/33 | Kahrs | 346—1 |
| 2,146,723 | 2/39 | Dunham et al. | 346—1 |
| 2,507,863 | 5/50 | Mesh | 346—33 |
| 2,672,392 | 3/54 | Caples et al. | 346—33 |
| 2,871,088 | 1/59 | Abell | 346—1 |
| 2,930,228 | 3/60 | Lawrence et al. | 73—159 |
| 2,951,736 | 9/60 | Black | 346—1 |
| 3,132,915 | 5/64 | Herman | 346—1 |

LEYLAND M. MARTIN, *Primary Examiner.*